US009344326B2

(12) United States Patent
Aoki et al.

(10) Patent No.: US 9,344,326 B2
(45) Date of Patent: May 17, 2016

(54) COMMUNICATION RELAY APPARATUS, ACTIVE SYSTEM SWITCHING METHOD, AND COMMUNICATION RELAY CONTROL BOARD

(75) Inventors: Yuu Aoki, Tokyo (JP); Toshiro Yamauchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 87 days.

(21) Appl. No.: 14/354,751

(22) PCT Filed: Aug. 3, 2012

(86) PCT No.: PCT/JP2012/004960
§ 371 (c)(1),
(2), (4) Date: Apr. 28, 2014

(87) PCT Pub. No.: WO2013/061496
PCT Pub. Date: May 2, 2013

(65) Prior Publication Data
US 2014/0301184 A1    Oct. 9, 2014

(30) Foreign Application Priority Data
Oct. 28, 2011    (JP) .................................. 2011-237985

(51) Int. Cl.
*G01R 31/08* (2006.01)
*H04L 12/24* (2006.01)
*H04L 12/46* (2006.01)
*H04L 12/413* (2006.01)
*H04L 12/703* (2013.01)

(52) U.S. Cl.
CPC .......... *H04L 41/0668* (2013.01); *H04L 12/413* (2013.01); *H04L 12/4625* (2013.01); *H04L 45/28* (2013.01)

(58) Field of Classification Search
CPC ....................................................... H04L 45/00
USPC ........................................................... 370/220
See application file for complete search history.

(56) References Cited

FOREIGN PATENT DOCUMENTS

| JP | 2004-112721 A | 4/2004 |
| JP | 2004-328687 A | 11/2004 |
| JP | 2006-5611 A | 1/2006 |
| JP | 2008-83896 A | 4/2008 |
| JP | 2010-136038 A | 6/2010 |

OTHER PUBLICATIONS

International Search Report (ISR) (PCT Form PCT/ISA/210), in PCT/JP2012/004960, dated Oct. 2, 2012.

*Primary Examiner* — Samina Choudhry
(74) *Attorney, Agent, or Firm* — McGinn IP Law Group, PLLC

(57) ABSTRACT

A communication relay apparatus in which when an operation state of a first board is an active system and a fault in the first board is detected, a first transmission control circuit gives an instruction to an IF unit as to whether usage of a first transmission path is allowed and notifies a second transmission control circuit and a first communication state control unit that the fault is detected, the second transmission control circuit gives an instruction to the IF unit as to whether usage of a second transmission path is allowed, and when an evaluation is made to switch the operation state of the first board to the standby system, the first communication state control unit starts to take over the communication state of the communication data, which has passed through the first transmission path, to the second communication state control unit.

14 Claims, 16 Drawing Sheets

| # | OPERATION STATE | DEFINITION |
|---|---|---|
| 1 | UNMOUNT | STATE IN WHICH BOARD IS UNMOUNTED FROM APPARATUS |
| 2 | INIT | INITIALIZING |
| 3 | ACT | ACTIVE STATE |
| 4 | SBY | STANDBY STATE |
| 5 | ACT-FLT | ACTIVE STATE AND FAULTY |
| 6 | SBY-FLT | STANDBY STATE AND FAULTY |
| 7 | OOS | STOPPED |
| 8 | FORCED ACT | INTERNAL STATE USED TEMPORARILY WHILE SWITCHING ETC. FORCED TO OUTPUT ACT SIGNAL (ACT=ON) |
| 9 | FORCED SBY | INTERNAL STATE USED TEMPORARILY WHILE SWITCHING ETC. FORCED TO STOP ACT SIGNAL (ACT=OFF) |

Fig. 5

| # | OWN-SYSTEM FLT | OTHER-SYSTEM FLT | ACT OPERATION PATTERN | | | | | | | | | | | | | | | |
|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 |
| 1 | ON | ON | OFF | OFF | OFF | OFF | OFF | OFF | OFF | OFF | ON | ON | ON | ON | ON | ON | ON | ON |
| 2 | ON | OFF | OFF | OFF | OFF | OFF | ON | ON | ON | ON | OFF | OFF | OFF | OFF | ON | ON | ON | ON |
| 3 | OFF | ON | OFF | OFF | ON | ON | OFF | OFF | ON | ON | OFF | OFF | ON | ON | OFF | OFF | ON | ON |
| 4 | OFF | OFF | OFF | ON | OFF | ON | OFF | ON | OFF | ON | OFF | ON | OFF | ON | OFF | ON | OFF | ON |

Fig. 7

| # | OPERATION STATE | ACT OPERATION PATTERN | |
|---|---|---|---|
| | | (BINARY) | (HEXADECIMAL) |
| 1 | ACT | 11 | 0xB |
| 2 | SBY | 2 | 0x2 |
| 3 | ACT-FLT<br>FORCED ACT | 15 | 0xF |
| 4 | SBY-FLT<br>OOS<br>INIT<br>INIT-FLT<br>FORCED SBY | 0 | 0x0 |

Fig. 8

COMMUNICATION RELAY APPARATUS, ACTIVE SYSTEM SWITCHING METHOD, AND COMMUNICATION RELAY CONTROL BOARD

TECHNICAL FIELD

The present invention relates to a communication relay apparatus, an active system switching method, and a communication relay control board, and particularly to a communication relay apparatus including a plurality of control boards mounted therein in a redundant manner, an active system switching method, and a communication relay control board.

BACKGROUND ART

Patent Literature 1 discloses a technique concerning a redundant system including lines composed of a SONET/SDH (Synchronous Optical NETwork/Synchronous Digital Hierarchy) network. In the redundant system of Patent Literature 1, the fault detection unit of the INF on the reception side monitors a fault in the respective paths in lines on the reception side and notifies the switch evaluation unit of a result of monitoring. Then, the switch evaluation unit selects a path according to a notification and notifies the INF on the transmission side.

CITATION LIST

Patent Literature

Patent Literature 1: Japanese Unexamined Patent Application Publication No. 2004-328687

SUMMARY OF INVENTION

Technical Problem

As there is one switch evaluation unit per communication relay apparatus in Patent Literature 1, Patent Literature 1 has room for improvement, which is to provide redundant switching evaluation units. In recent years, there is a need for a wired or wireless communication relay apparatus to support not only the time-division multiplexing but also the all-packet network.

However, in the communication relay apparatus as in Patent Literature 1, there has been a problem that it is difficult to provide redundant control units inside the apparatus while satisfying the above need.

In general, switching the communication in the time-division multiplexing is often targeted to be completed within 50 ms. Thus, it might be possible to use a board that is composed by integrating a TDM (Time Division Multiplexing) switching circuit (hereinafter referred to as a "TDMSW") and a hardware circuit for monitoring a fault and to switch the TDMSW in case of a fault. By providing a redundant board of such a board and when a fault occurs in one of the TDMSWs and switching to the other TDMSW using the above-mentioned hardware circuit, it would be possible to achieve switching within 50 ms.

However, as switching in the all-packet network requires takeover of a communication status and a protocol, it is necessary to switch the control device, such as CPUs (Central Processing Unit). There are various cases of the communication status and protocol in case of a fault, and thus information to be taken over differs from case to case. Therefore, such takeover cannot be performed by only the above-mentioned hardware circuit dedicated for switching, thereby disabling the communication after the switching or making the communication state inaccurate. Accordingly, it is not possible to achieve switching in the all-packet network by only providing redundant hardware circuits dedicated for switching. On the contrary, by simply providing redundant CPUs and switching them by only the CPUs, it takes time to switch the communication in the time-division multiplexing, thereby not achieving the switching within 50 ms.

The present invention is made to solve such a problem and aims to provide a communication relay apparatus, an active system switching method, and a communication relay control board that realize accurate takeover of the communication state while maintaining the speed of switching in the switching control by the communication relay apparatus that performs a communication relay in the time-division multiplexing and the all-packet network.

Solution to Problem

According to a first exemplary aspect of the present invention, a communication relay apparatus includes:
an IF unit that externally transmits and receives communication data;
a first board that includes:
a first transmission control circuit that is connected to the IF unit by a first transmission path and controls usage of the first transmission path by the IF unit; and
a first communication state control unit that manages a communication state of the communication data that has passed through the first transmission path; and
a second board that is mounted as a redundant board of the first board and comprises:
a second transmission control circuit that is connected to the IF unit by a second transmission path and controls usage of the second transmission path by the IF unit; and
a second communication state control unit that manages a communication state of the communication data that has passed through the second transmission path, in which
when an operation state of the first board is an active system and the first transmission control circuit detects a fault in the first board, the first transmission control circuit gives an instruction to the IF unit as to whether or not the usage of the first transmission path is allowed and notifies the second transmission control circuit and the first communication state control unit that the fault is detected,
in response to a notification from the first transmission control circuit, the second transmission control circuit gives an instruction to the IF unit as to whether or not the usage of the second transmission path is allowed,
the first communication state control unit evaluates as to whether or not to switch the operation state of the first board to a standby system, and
when an evaluation is made to switch the operation state of the first board to the standby system, the first communication state control unit starts to take over the communication state of the communication data, which has passed through the first transmission path, to the second communication state control unit.

According to a second exemplary aspect of the present invention, a method of switching an active system using a communication relay apparatus that includes:
an IF unit that externally transmits and receives communication data;
a first board that includes:

a first transmission control circuit that is connected to the IF unit by a first transmission path and controls usage of the first transmission path by the IF unit; and a first communication state control unit that manages a communication state of the communication data that has passed through the first transmission path; and a second board that is mounted as a redundant first board and comprises:

a second transmission control circuit that is connected to the IF unit by a second transmission path and controls usage of the second transmission path by the IF unit; and a second communication state control unit that manages a communication state of the communication data that has passed through the second transmission path, the method including:

when an operation state of the first board is an active system and the first transmission control circuit detects a fault in the first board, by the first transmission control circuit, giving an instruction to the IF unit as to whether or not the usage of the first transmission path is allowed and notifying the second transmission control circuit and the first communication state control unit that the fault is detected, in response to a notification from the first transmission control circuit, by the second transmission control circuit, giving an instruction to the IF unit as to whether or not the usage of the second transmission path is allowed, by the first communication state control unit, evaluating as to whether or not to switch the operation state of the first board to a standby system, and when an evaluation is made to switch the operation state of the first board to the standby system, by the first communication state control unit, starting to take over the communication state of the communication data that has passed through the first transmission path.

According to a third exemplary aspect of the present invention, a communication relay control board includes:

a first transmission control circuit that is connected to an IF unit, which externally transmits and receives communication data, by a first transmission path and controls usage of the first transmission path by the IF unit; and a first communication state control unit that manages a control state of the communication data that has passed through the first transmission path, in which the communication relay control board is mounted as a redundant board of another board that is connected to the IF unit by a second transmission path, when an operation state of the first transmission control circuit is an active system and detects its own fault, the first transmission control circuit gives an instruction to the IF unit as to whether or not the usage of the first transmission path is allowed, notifies the other board that the fault is detected and gives an instruction to the IF unit whether or not usage of the second transmission path is allowed, and notifies the first communication state control unit that the fault is detected, in response to a notification from the first transmission control circuit, the first communication state control unit evaluates as to whether or not to switch its own operation state to a standby system, and when the first communication state control unit evaluates that its own operation state is switched to the standby system, the first communication state control unit starts to take over the communication state of the communication data, which has passed through the first transmission path, to the other board.

Advantageous Effects of Invention

According to the present invention, it is possible to provide a communication relay apparatus, an active system switching method, and a communication relay control board that realize accurate takeover of the communication state while maintaining the speed of switching in switching control by the communication relay apparatus that performs a communication relay in the time-division multiplexing and the all-packet network.

BRIEF DESCRIPTION OF DRAWINGS

FIG. 5 is a diagram showing an example of operation states of a device control card according to the second exemplary embodiment of the present invention;

FIG. 7 is a diagram showing an example of an evaluation rule of an ACT signal according to the second exemplary embodiment of the present invention;

FIG. 8 is a diagram showing an example of a correspondence relation between the operation states and ACT operation patterns according to the second exemplary embodiment of the present invention;

DESCRIPTION OF EMBODIMENTS

Figure 1:
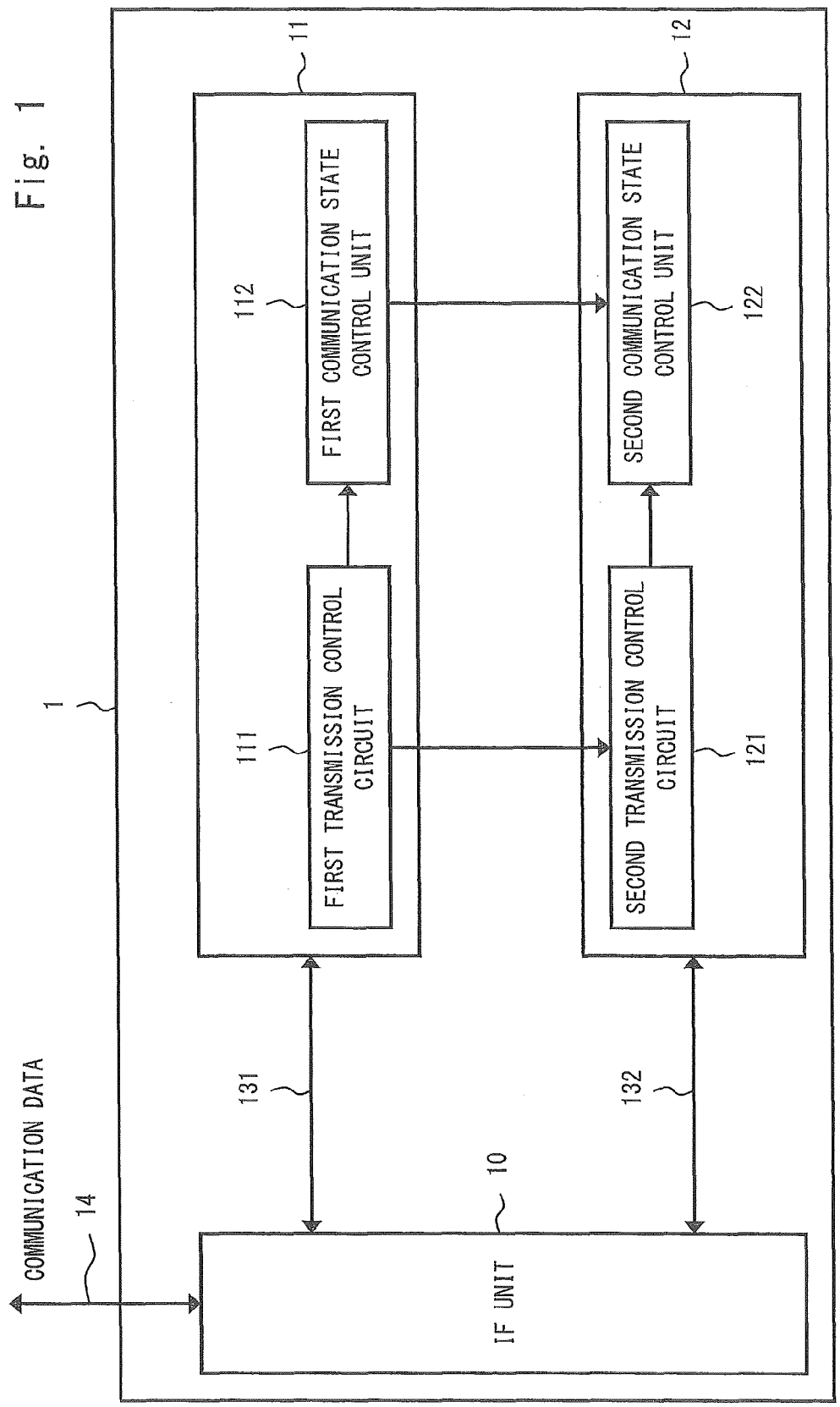
FIG. 1 is a block diagram showing a configuration of a communication relay apparatus according to a first exemplary embodiment of the present invention.

Hereinafter, specific embodiments incorporating the present invention shall be explained in detail with reference to the drawings. The same components are denoted by the same reference numerals throughout the drawings, and a repeated explanation shall be omitted as necessary for clarity of the explanation.

<First Exemplary Embodiment>

FIG. 1 is a block diagram showing a configuration of a communication relay apparatus 1 according to a first exemplary embodiment of the present invention. The communication relay apparatus 1 is an apparatus that relays communication data 14 that is exchanged among a plurality of external communication base stations and communication terminals. The communication relay apparatus 1 may be, for example, a microwave communication system (e.g., a communication system apparatus that links mobile phone base stations). Note that microwave communication systems often support optical microwave communication, wireless communication and the like.

The communication relay apparatus 1 includes at least an IF unit 10, a first board 11, and a second board 12. Note that the communication relay apparatus 1 has other components necessary for relaying the communication in addition to the ones stated above. However, as those components are commonly-known components, an illustration and explanation thereof shall be omitted.

The IF unit 10 externally transmits and receives the communication data 14. The communication data 14 is data exchanged among a plurality of external communication base stations and communication terminals. The first board 11 is a board connected to the IF unit 10 by a first transmission path 131. Moreover, the second board 12 is a board connected to the IF unit 10 by a second transmission path 132. Both the first transmission path 131 and the second transmission path 132 are buses for transmitting the communication data 14.

Each of the first board 11 and the second board 12 is a control board having a function to independently control relay processing of the communication data 14 in the communication relay apparatus 1. Further, the first board 11 and the second board 12 are mounted in the communication relay apparatus 1 in a redundant manner. Normally, an operation state of one of the boards is an active system, and an operation state of the other board is a standby system. Moreover, the number of control boards mounted in the communication relay apparatus 1 is not limited to two and may be three or more.

The first board 11 includes a first transmission control circuit 111 and a first communication state control unit 112. The first transmission control circuit 111 is a semiconductor integrated circuit that controls usage of the first transmission path 131 by the IF unit 10. The first transmission control circuit 111 can be implemented by, for example, FPGA (Field Programmable Gate Array). Moreover, the first transmission control circuit 111 controls, for example, cross connections and switching of paths in time-division multiplexing communication. The first communication state control unit 112 manages a communication state of the communication data 14, which has passed through the first transmission path 131. The communication state is, for example, fault and maintenance information in Ehter OAM (Operation Administration and Maintenance) in the all-packet network, a communication state, information and the like of a control frame in a protection function, such as STP (Spanning Tree Protocol), (the control frame referred to as a BPDU frame in the case of the STP). The first communication state control unit 112 can be implemented by, for example, causing a CPU to read and execute a FW (FirmWare), which is a computer program implementing communication relay control processing.

The second board 12 includes a second transmission control circuit 121 and a second communication state control unit 122. The second transmission control circuit 121 controls usage of the second transmission path 132 by the IF unit 10. The second communication state control unit 122 manages a communication state of the communication data 14, which passes through the second transmission path 132. Other configurations are similar to those of the first board 11.

As explained above, when the first board 11 is an active system, the IF unit 10 transmits the communication data 14 to the first board 11 through the first transmission path 131, whereas when the second board 12 is the active system, the IF unit 10 transmits the communication data 14 to the second board 12 through the second transmission path 132.

Figure 2:
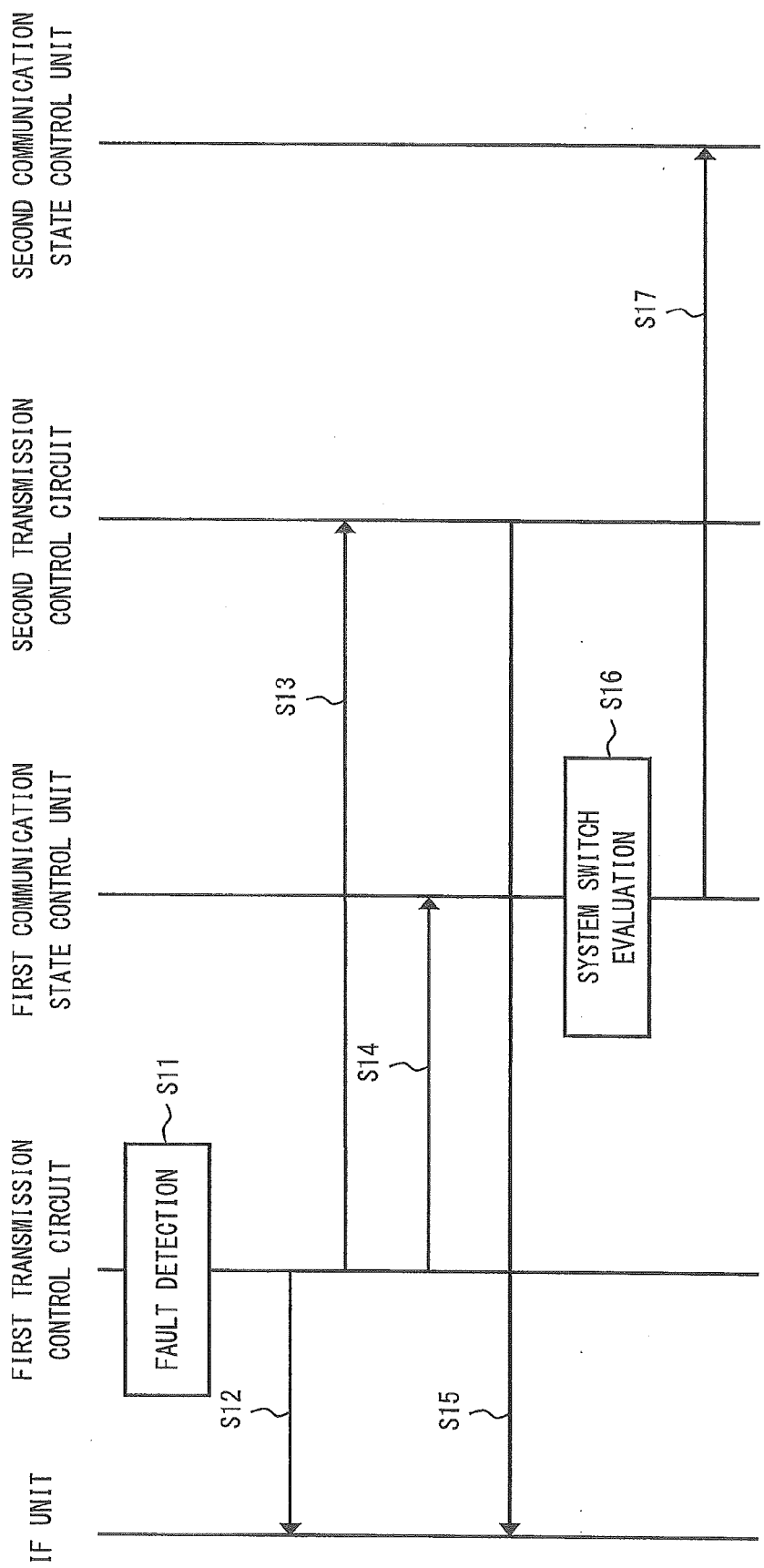
FIG. 2 is a sequence diagram showing a flow of active system switching processing upon detection of a fault according to the first exemplary embodiment of the present invention.

FIG. 2 is a sequence diagram showing a flow of active system switch processing upon detection of a fault according to the first exemplary embodiment of the present invention. Assume that the operation state of the first board 11 is the active system, and the operation state of the second board 12 is the standby system. However, the operation will be similar to the operation explained below even when the operation states of the first board 11 and the second board 12 are reversed.

First, the first transmission control circuit 111 detects a fault inside the first board 11 (S11). Next, the first transmission control circuit 111 gives an instruction to the IF unit 10 as to whether or not usage of the first transmission path 131 is allowed (S12). Usually, since the communication relay apparatus 1 is unable to continue a communication relay due to the fault inside the first board 11, the first transmission control circuit 111 gives an instruction to the IF unit 10 that the usage of the first transmission path 131 is not allowed. In this manner, the first transmission control circuit 111, which is a hardware circuit, can stop the communication data 14 from being transmitted through the first transmission path 131 to the first board 11, which is likely to be incapable of performing normal processing, immediately after detecting a fault.

Moreover, together with Step S12, the first transmission control circuit 111 notifies the second transmission control circuit 121 and the first communication state control unit 112 that the fault is detected (S13 and S14).

Next, in response to the notification from the first transmission control circuit 111, the second transmission control circuit 121 gives an instruction to the IF unit 10 as to whether or not the usage of the second transmission path 132 is allowed (S15). As mentioned above, since the usage of the first transmission path 131 is not allowed in Step S12, under normal circumstances, the second transmission control circuit 121 gives an instruction to the IF unit 10 that the usage of the second transmission path 132 is allowed. After the first transmission control circuit 111 gives an instruction that the usage of the first transmission path 131 is not allowed, the second transmission control circuit 121, which is a hardware circuit, promptly allows the usage of the second transmission path 132. Thus, the IF unit 10 can switch the transmission path from the first transmission path 131 to the second transmission path 132. It is therefore possible to continue to receive the communication data 14, which has been received by the first board 11 before the fault occurs, using the second board 12 that is the standby system. Thus, for example, when TDMSW is made redundant in the first board 11 and the second board 12, the TDMSWs can be switched by the hardware circuits. Accordingly, it is possible to realize switching in time-division multiplexing communication within 50 ms.

Moreover, the first communication state control unit 112 evaluates as to whether or not to switch the operation state of the first board 11 to the standby system according to the notification from the first transmission control circuit 111 (S16). For example, the first communication state control unit 112 evaluates as to whether or not to switch according to a state of communication that has been started before the fault is detected, a content of a protocol or the like. Next, when the first communication state control unit 121 makes an evaluation to switch the operation state of the first board 11 to the standby system, the first communication state control unit 112 starts to take over the communication state of the communication data 14, which has passed through the first transmission path 131, to the second communication state control unit 122 (S17). After the takeover is completed, the second communication state control unit 122 changes the operation state of the second board 12 to the active system. Further, the first communication state control unit 112 changes the operation state of the first board 11 to the standby system at least before the operation state of the second board 12 is changed to the active system. In this manner, it is possible to realize accurate switching of the active system accompanying the takeover of the communication state after a fault occurs in the first board 11. Therefore, when, for example, L2SW is made redundant in the first board 11 and the second board 12, the L2SWs can be switched by control of the firmware. It is thus possible to accurately switch in the all-packet network.

Generally, as the takeover processing of the communication state is executed by the firmware in the control device, it takes more time for processing than when it is executed by the hardware circuit. Therefore, suppose that when the transmission path is switched after the takeover of the communication state is completed, the IF unit 10 continues to transmit the communication data 14 to the first board 11, which has a fault, through the first transmission path 131 after the fault is detected until the handover is completed. Thus, there may be a lack in the data transmitted after the fault is detected until the takeover is completed or the data may not be correctly processed. As a result, a retransmission request and the like is made by the IF unit 10 to outside, thereby possibly causing a delay in a communication relay.

Accordingly, in the first exemplary embodiment of the present invention, the transmission path of the communication data 14, which has been continued before the fault occurs, is quickly switched to the second transmission path 132, so that the communication data 14 is continuously received by and can be at least held in the second board 12, which is the standby system with no fault. After that, when the communication state is correctly taken over, processing of the communication data 14, which has been held after the switching by the second communication state control unit 122, is collectively resumed, thereby minimizing a delay in the communication relay.

That is, in the first exemplary embodiment of the present invention, since the switching of the transmission path by the hardware circuit has the highest priority, the transmission of the communication data 14, which has been performed by the first board 11, is resumed early. By doing so, a minimum communication relay can be maintained. Further, by performing the takeover of the communication state under control of the firmware in the meantime, it is possible to correctly continue the communication relay after the active system is switched.

As explained above, according to the first exemplary embodiment of the present invention, it is possible to realize accurate takeover of the communication state while maintaining the speed of switching in switching control by the communication relay apparatus that performs a communication relay in the time-division multiplexing and the all-packet network.

<Second Exemplary Embodiment>

Figure 3:
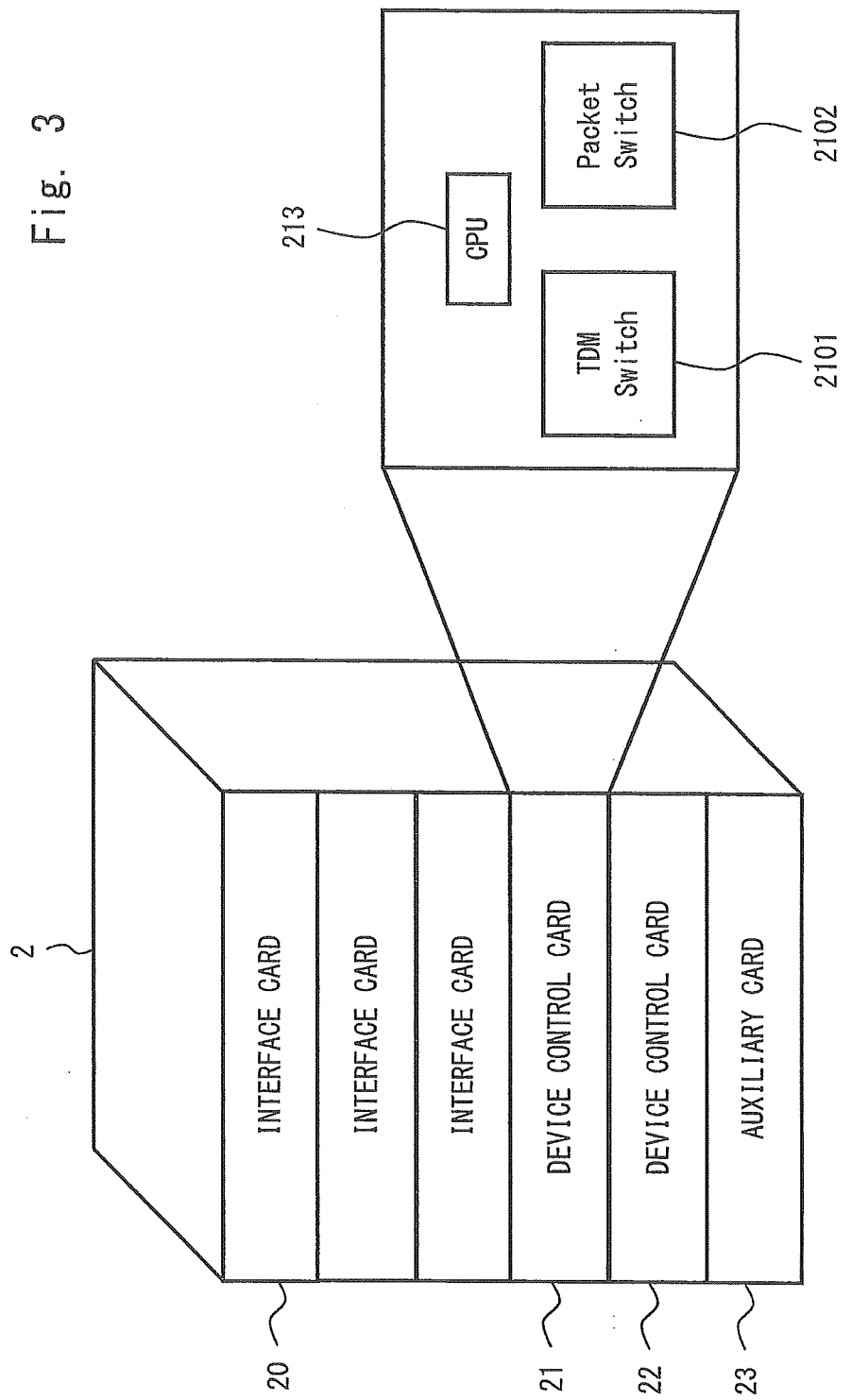
FIG. 3 is a block diagram schematically showing a communication relay apparatus according to a second exemplary embodiment of the present invention.

FIG. 3 is a block diagram schematically showing a communication relay apparatus 2 according to a second exemplary embodiment of the present invention. The communication relay apparatus 2 includes, for example, a plurality of slots disposed in a casing shown in FIG. 3, and a card, which is a board with a predetermined size and includes an input/output interface, is removably mounted in each of the slots. FIG. 3 shows that a plurality of interface cards 20, device control cards 21 and 22, an auxiliary card 23 and the like are mounted in the communication relay apparatus 2. Note that the number of the device control cards may be three or more. Moreover, assume that the device control card 21 includes, for example, a CPU 212, a TDM Switch 2101, a Packet Switch 2102 and the like.

Figure 4:
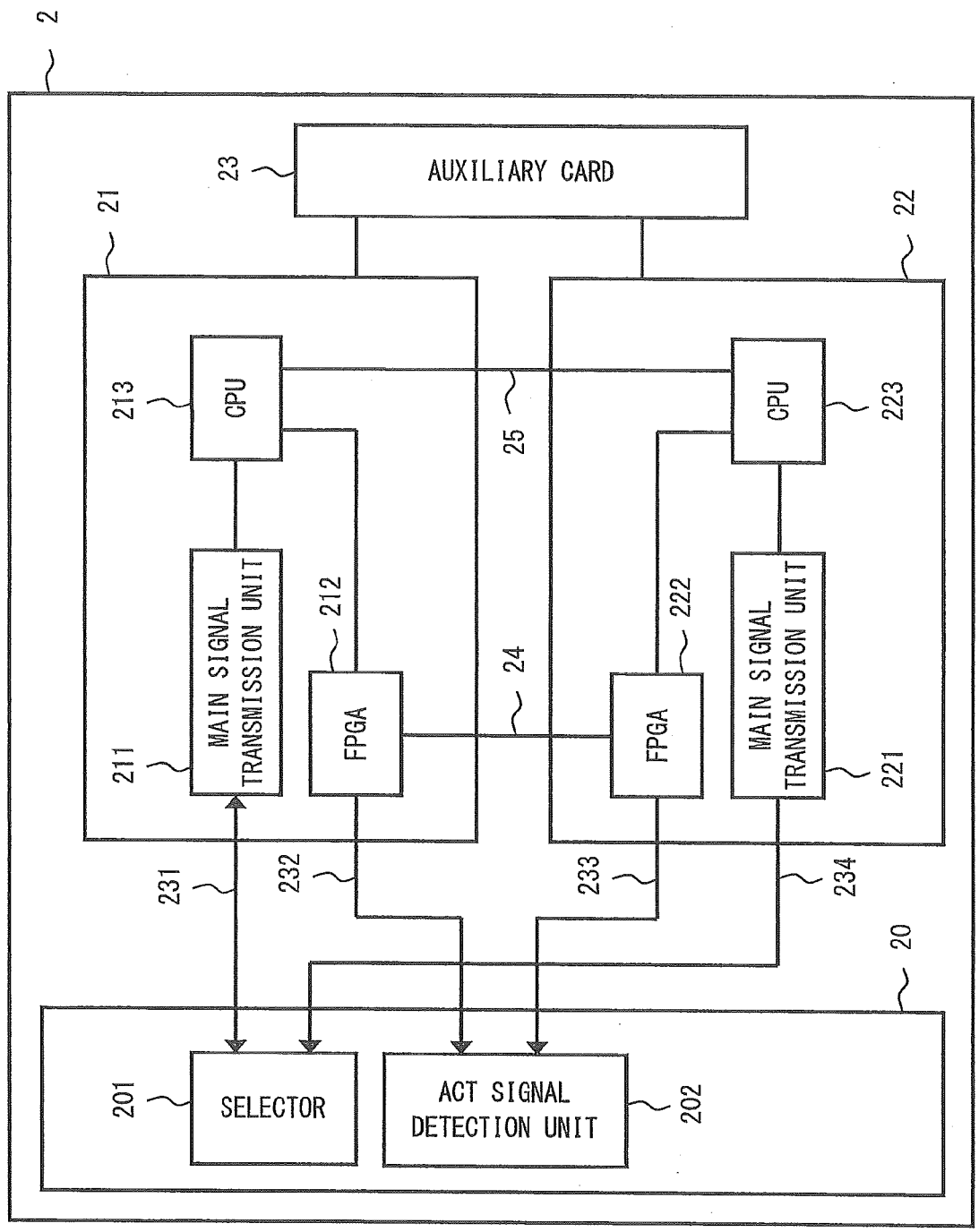
FIG. 4 is a block diagram showing main components of the communication relay apparatus according to the second exemplary embodiment of the present invention.

FIG. 4 is a block diagram showing main components of the communication relay apparatus 2 according to the second exemplary embodiment of the present invention. The communication relay apparatus 2 is an apparatus that performs a communication relay of the time-division multiplexing and the all-packet network. The communication relay apparatus 2 includes the interface cards 20, the device control cards 21 and 22, and the auxiliary card (TERMinal) 23. Note that an illustration and explanation of other commonly-known components that are necessary for the communication relay apparatus shall be omitted.

The auxiliary card 23 includes an NMS (Network Management System) that can be connected to the communication relay apparatus 1 and an interface for communicating with other external devices as a DCN (Data Communication Network). The auxiliary card 23 is connected to each of the device control cards 21 and 22.

The interface card 20 and the device control card 21 are connected by a main signal bus 231 and a control bus 232. Moreover, the interface card 20 and the device control card 22 are connected by a control bus 233 and a main signal bus 234. The main signal buses 231 and 234 are examples of the first transmission path 131 and the second transmission path 132 in FIG. 1 and are transmission paths for transmitting communication data to be relayed by the communication relay apparatus 2 as a main signal. Further, when the main signal has data of the time-division multiplexing and all-packet network, each of the main signal buses 231 and 234 may include two transmission paths for the time-division multiplexing and all-packet network. The control buses 232 and 233 are transmission paths for transmitting various control signals from the device control cards 21 and 22.

The interface card 20 is one example of the IF unit 10 in FIG. 1 and includes a selector 201 and an ACT signal detection unit 202. The selector 201 is connected to a main signal transmission unit 211 of the device control card 21 by the main signal bus 231. Moreover, the selector 201 is connected to the main signal transmission unit 221 of the device control card 22 by the main signal bus 234. The ACT signal detection unit 202 is connected to an FPGA 212 of the device control card 21 by the control bus 232. Moreover, the ACT signal detection unit 202 is connected to an FPGA 222 of the device control card 22 by the control bus 233.

The ACT signal detection unit 202 receives a control signal (an ACT signal) indicating as to whether usage of the main signal bus 231 is allowed through the control bus 232 and receives a control signal (an ACT signal) indicating as to whether usage of the main signal bus 234 is allowed through the control bus 233. The selector 201 selects one of the main signal buses 231 and 234 based on the control signals received by the ACT signal detection unit 202 and transmits the communication data.

The device control card 21 is one example of the first board 11 in FIG. 1. The device control card 21 includes the main signal transmission unit 211, the FPGA 212 and a CPU 213. The main signal transmission unit 211 is a transmission circuit that transmits a main signal to the interface card 20 through the main signal bus 231. The main signal transmission unit 211 may include, for example, a TDMSW for transmitting communication data of the time division multiplexing and an L2SW for transmitting communication data of the all-packet network.

The FPGA 212 is one example of the first transmission control circuit 111 in FIG. 1. The FPGA 212 is a circuit that transmits a control signal to the interface card 20 through the control bus 232. The CPU 213 is one example of the first communication state control unit 112 in FIG. 1. The CPU 213 performs communication relay control processing by reading and executing the above-mentioned FW.

The device control card 22 is one example of the second board 12 in FIG. 1. The device control card 22 includes the main signal transmission unit 221, the FPGA 222 and the CPU 223. The FPGA 222 is one example of the second transmission control circuit 121 in FIG. 1. The CPU 223 is one example of the second communication state control unit 122 in FIG. 1. The main signal transmission unit 221, the FPGA 222, and the CPU 223 have a function equivalent to those of the main signal transmission unit 211, the FPGA 212, and the CPU 213, respectively.

Moreover, the device control cards 21 and 22 are connected by a DC line 24 and Ethernet (registered trademark) 25. Thus, the FPGAs 212 and 222 transmit and receive various control signals through the DC line 24. Further, the CPUs 213 and 223 transmit and receive a communication state and the like via the Ethernet 25.

Now the features and advantageous effects of the second exemplary embodiment according to the present invention shall be explained. First, when the FPGA 212 detects a fault in the device control card 21 while the operation state of the device control card 21 is the active system, the FPGA 212 gives an instruction to the interface card 20 as to whether or not the usage of the main signal bus 231 is allowed and also notifies the FPGA 222 and the CPU 213 that the fault is detected. Then, in response to the notification from the FPGA 212, the FPGA 222 gives an instruction to the interface card 20 as to whether or not the usage of the main signal bus 234 is allowed. Moreover, in response to the notification from the FPGA 212, the CPU 213 evaluates as to whether or not to switch the operation state of the device control card 21 to the standby system. When an evaluation is made to switch to the standby system, the CPU 213 starts to take over the communication state of the communication data, which has passed through the main signal bus 231, to the CPU 223. It is thus possible to achieve an advantageous effect similar to that of the first exemplary embodiment.

Furthermore, the FPGA 222 notifies the FPGA 212 of existence or absence of a fault in the device control card 22. When the FPGA 212 detects a fault in the device control card 21 while the operation state of the device control card 21 is the active system, the FPGA 212 evaluates as to whether or not the usage of the main signal bus 231 is allowed according to existence or absence of a fault in the device control card 22 and gives an instruction to the interface card 20 based on the evaluation result. As described so far, by performing a switching evaluation using the hardware circuit taking into account a fault in the active system and the standby system, it is possible to handle the case in which a fault exists in both systems. For example, when there is a fault in both systems, even when switching is performed immediately, it might not be possible to continue the communication relay in the switched board. Therefore, in such a case, a switching evaluation is performed through a detailed analysis using a CPU on a subsequent circuit side without forcefully switching the board by the hardware circuit, thereby making it possible to avoid unnecessary switching.

Furthermore, when the operation state of the device control card 21 is switched, the CPU 213 determines a switch pattern for the FPGA 212 to switch between whether or not the usage of the main signal bus 231 is allowed according to the switched operation state and sets the determined switch pattern in the FPGA 212. When the FPGA 212 detects a fault in the device control card 21 or receives the notification from the FPGA 222 that a fault is detected, the FPGA 212 identifies whether or not the usage of the main signal bus 231 is allowed according to the switch pattern that has been set by the CPU 213 and a combination of existence or absence of a fault in the device control card 21 and existence or absence of a fault in the device control card 22, and gives an instruction of a result of the identification to the interface card 20. Thus, as the FPGA 212 autonomously performs an evaluation using only two pieces of fault information and switches the main signal bus 231, high speed processing is possible.

Moreover, when a fault is detected in the device control card 21 that cannot be detected by the FPGA 212, the CPU 213 notifies the FPGA 212 that the fault in the device control card 21 is detected. When the FPGA 212 receives the notification from the CPU 213, the FPGA 212 detects the fault as a fault in the device control card 21. In this manner, a fault that cannot be detected by the hardware circuit alone is detected by the FW, thereby making it possible to switch the operation state in a similar manner to when a fault is detected by the hardware circuit alone. That is, the FW can make a comprehensive evaluation.

Further, in response to the notification from the FPGA 212, the FPGA 222 further notifies the CPU 223 that the device control card 21 is faulty. At this time, in response to the notification from the FPGA 222, the CPU 223 changes the operation state of the device control card 22 to a state not allowed to be switched (the operation state is forcefully fixed) and notifies the CPU 213 to that effect. Then, in response to the notification from the CPU 223, the CPU 213 transfers the communication state of the communication data, which has passed through the main signal bus 231, to the CPU 223. Next, after the CPU 223 completes setting of the communication state that has been transferred from the CPU 213, the CPU 223 switches the operation state of the device control card 22 to the active system. In this manner, it is possible to prevent failback due to double fault, such that after a fault occurs in an operation system, a fault is incorrectly recognized in a standby system, thereby enabling a stable switching of the operation state.

FIG. 5 is a diagram showing an example of operation states of the device control card according to the second exemplary embodiment of the present invention. FIG. 5 shows, for example, seven operation states, which are "UNMOUNT", "INIT", "ACT", "SBY (StandBY)", "ACT-FLT (FauLT)", "SBY-FLT", and "OOS (Out Of Service)". Moreover, the operation states of "FORCED ACT" and "FORCED SBY" may also be internally used as states to temporarily change during the switching. Note that the operation state is not limited to those examples of the operation states.

Figure 6:
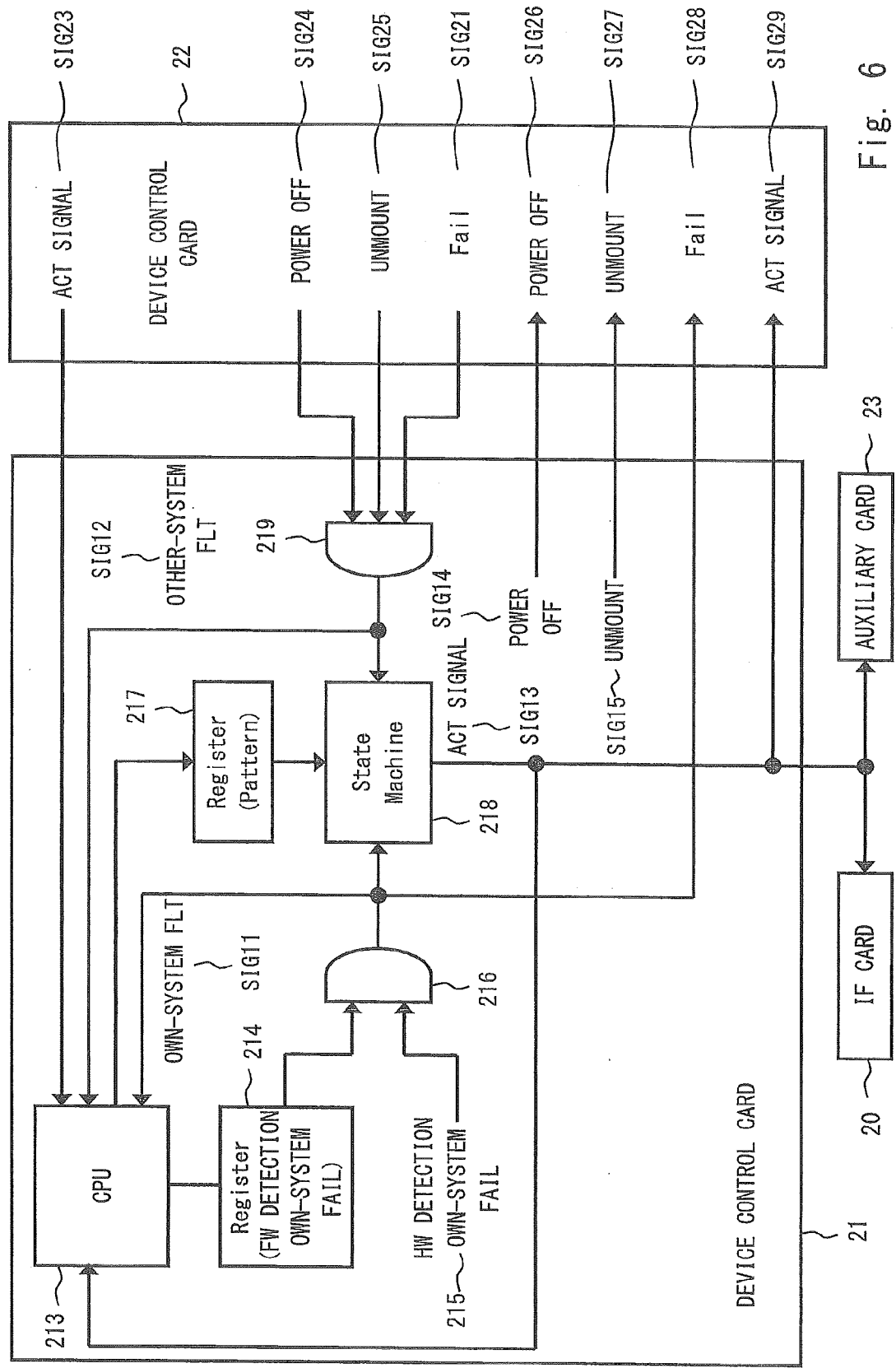
FIG. 6 is a block diagram showing main components of the device control card according to the second exemplary embodiment of the present invention.

FIG. 6 is a block diagram showing main components of the device control card according to the second exemplary embodiment of the present invention. In FIG. 6, an internal configuration of the device control card 21 is focused on, and as for other configuration, only the related parts are illustrated.

The device control card 21 includes the CPU 213, an FW (FirmWare) detecting own-system Fail 214, an HW (HardWare) detecting own-system Fail signal 215, an OR circuit 216, a Pattern 217, a State Machine 218, an OR circuit 219 and the like.

The FW detecting own-system Fail 214 is a register that records existence or absence of a fault that cannot be detected by the hardware circuit and detected by the FW. Specifically, the CPU 213 updates a flag of this register. The HW detecting own-system Fail signal 215 is a signal indicating existence or absence of a fault that is detected by the hardware circuit. Note that the hardware circuit that detects a fault inside the device control card 21 shall be included in the FPGA 212. The OR circuit 216 is a circuit for obtaining an OR between the flag of the FW detecting own-system Fail 214 and the Fail signal 215. Hereinafter, an output signal of the OR circuit 216 is referred to as an own-system FLT (FauLT) signal SIG11. The own-system FLT signal SIG11 indicates existence or absence of a fault in the device control card 21. The own-system FLT signal SIG11 is input to the CPU 213, the State Machine 218, and the device control card 22. Note that the device control card 22 receives the own-system FLT signal SIG11 from the device control card 21 as a Fail signal SIG28 of the other system.

The Pattern 217 is a register that records a switch pattern that is determined according to the operation state of the device control card 21.

The OR circuit 219 is a circuit that inputs a plurality of signals regarding a fault in the device control card 22, which is the other system, and outputs an OR of those signals as an other-system FLT signal SIG12. As the plurality of signals regarding a fault in the other system here, a power OFF signal SIG24 indicating power-down of the device control card 22, an unmount signal SIG25 indicating that the device control card 22 is unmounted from the communication relay apparatus 2, and a Fail signal SIG21 indicating an own-system FLT of the device control card 22 are illustrated. Note that the signals regarding a fault in the other system are not limited to these.

The State Machine 218 evaluates as to whether or not the usage of the main signal bus 231 is allowed according to the own-system FLT signal SIG11, the other-system FLT signal SIG12, and the switch pattern recorded in the Pattern 217, and outputs the evaluation as an ACT signal SIG13. The ACT signal SIG13 is input to the CPU 213, the device control card 22, the interface card 20, and the auxiliary card 23. Note that the device control card 22 receives the ACT signal SIG13 from the device control card 21 as an ACT signal SIG29 of the other system. The State Machine 218 evaluates as to whether or not the usage of the main signal 213 is allowed according to, for example, an evaluation rule of the ACT signal shown in FIG. 7.

FIG. 7 is a diagram showing an example of the evaluation rule of the ACT signal according to the second exemplary embodiment of the present invention. In FIG. 7, whether the ACT signal is turned ON/OFF is shown in association with combinations of ON/OFF of the own-system FLT signal and the other-system FLT signal and ACT operation patterns 0 to 15.

FIG. 8 is a diagram showing an example of a correspondence relation between the operation states and the ACT operation patterns according to the second exemplary embodiment of the present invention. The CPU 213 can record one of the seven patterns, which are from "INIT" to "FORCED SBY" from among the above-mentioned operation states shown in FIG. 5, in the Pattern 217. However, when all of the operation states are recorded to create the ACT operation patterns, the number of combinations shown in FIG. 7 will be enormous, thereby increasing the size of the circuit of the State Machine 218. Moreover, some of the seven operation states can have the same pattern of the ACT signal operation as a result of an evaluation according to the fault information of the own system and the other system. Thus, the associations between the seven operation states and the four ACT operation patterns are defined as shown in FIG. 8, and FIG. 7 is defined based on FIG. 8. After the operation state of the device control card 21 is switched, the CPU 213 determines the ACT operation pattern using the switched operation state based on the associations of FIG. 8. Then, the CPU 213 records the determined ACT operation pattern in the Pattern 217. In this manner, the size of the circuit of the State Machine 218 can be controlled. In addition, since an output of an ACT line can be evaluated by only the fault information of the own system and other system in processing by the FPGA, the speed of the processing can be increased. Note that the associations of FIG. 8 are not limited to those explained above. Those associations can be updated by, for example, changing the setting of the FPGAs 212 and 222.

An example shall be explained below. When the operation state of the device control card 21 is "ACT", the operation state of the device control card 22 is "SBY", the device control card 21 is faulty, and the device control card 22 is not faulty, in the FPGA 212, if the ACT operation pattern is "11(0xB)", the own-system FLT signal SIG11=ON and the other-system FLT signal SIG12=OFF. Thus the ACT signal SIG13=OFF. Meanwhile, in the FPGA 222, when the ACT operation pattern is "2(0x2)", the own-system FLT signal (Fail signal SIG21)=OFF and the other-system FLT signal (OR of the power OFF signal SIG26, the unmount signal SIG27, and the Fail signal SIG 28)=ON. Thus the ACT signal SIG 23=ON.

Referring back to FIG. 6, the explanation shall be continued. The CPU 213 inputs the ACT signal SIG13 from the State Machine 218, the ACT signal SIG23, the own-system FLT signal SIG11, and the other-system FLT signal SIG12 from the device control card 22. In particular, when the CPU 213 receives the own-system FLT signal SIG11 or the other-system FLT signal SIG12, the CPU 213 analyzes a content of the fault in the own system and the other system and comprehensively evaluates as to whether it is necessary to switch the operation state.

Moreover, the device control card 22 inputs the power OFF signal SIG14, the unmount signal SIG15, the own-system FLT signal SIG11, and the ACT signal SIG13 from the device control card 21 as the other-system signals, and outputs the power OFF signal SIG24, the unmount signal SIG25, the Fail signal SIG21, and the ACT signal SIG23 to the device control card 21. Note that the device control card 22 receives the power OFF signal SIG14 and the unmount signal SIG15 from the device control card 21 as the power OFF signal SIG26 and the unmount signal SIG 27 of the other system.

Figure 9:
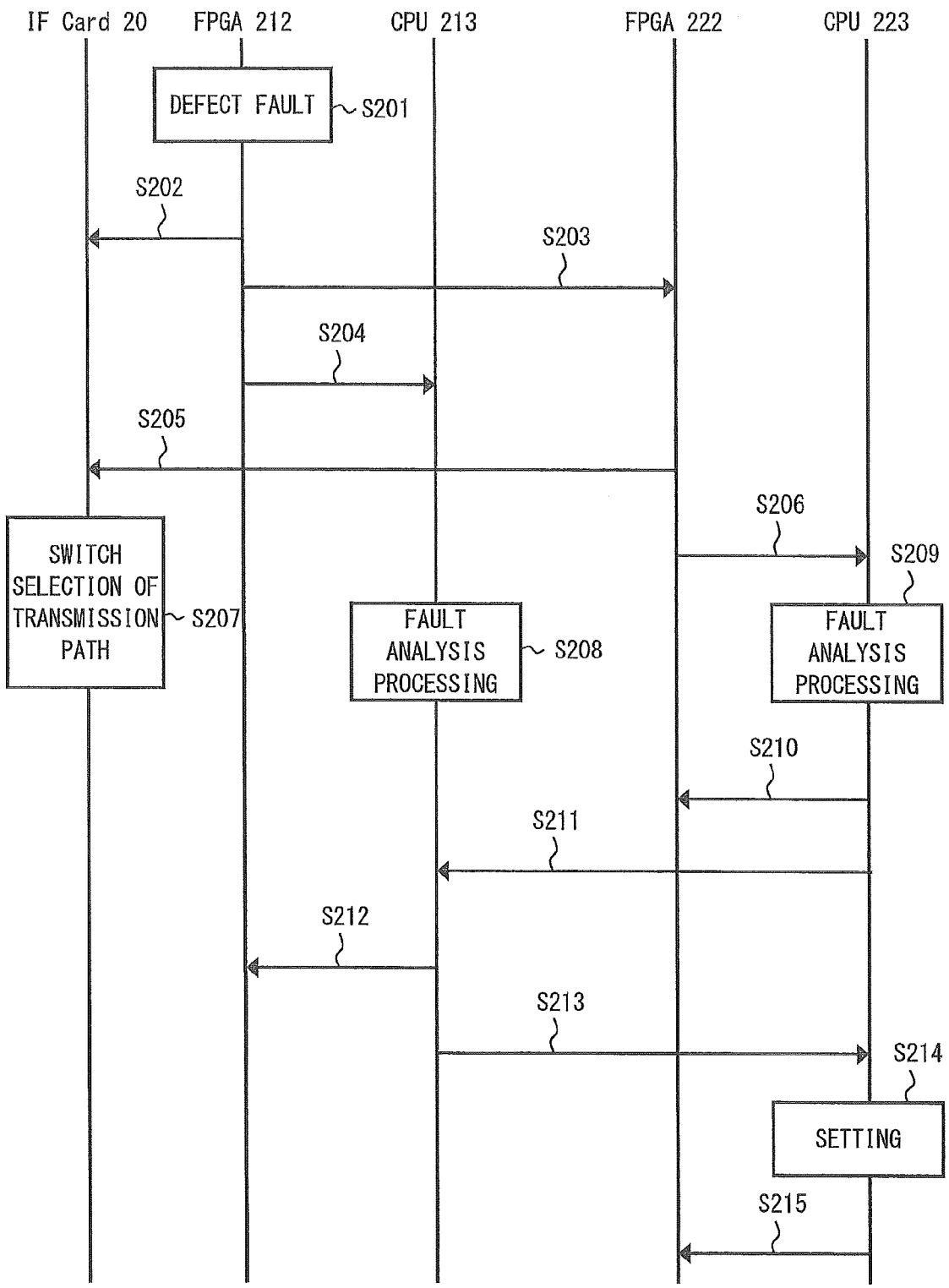
FIG. 9 is a sequence diagram showing a flow of an active system switching process upon defection of a fault according to the second exemplary embodiment of the present invention.

FIG. 9 is a sequence diagram showing a flow of operation system switch processing upon detection of a fault according to the second exemplary embodiment of the present invention. In the following explanation, refer to FIGS. 11 to 16 as appropriate. FIGS. 11 to 16 are diagrams showing an example of an active system switch operation upon detection of a fault according to the second exemplary embodiment of the present invention. Assume that the operation state of the device control card 21 is "ACT", while the operation state of the device state card 22 is "SBY". Therefore, in FIG. 11, the CPU 213 recognizes that the operation state (hereinafter referred to as a "mode") m1 is "ACT", and the FPGA 212 recognizes that the ACT operation pattern (hereinafter referred to as a "pattern") p1 is "0xB." Moreover, the CPU 223 recognizes that a mode m2 is "SBY", and the FPGA 222 recognizes a pattern p2 is "0x2." Further, since the ACT signal from the device control card 21 is "ON", the selector 201 inside the interface card 20 selects the main signal bus 231. Furthermore, the device control card 21 performs communication relay processing, and the CPU 213 holds a communication state CS. Assume that a part of the device control card 21 becomes faulty at this time. Firstly, the FPGA 212 detects the fault inside the device control card 21 (S201, FIG. 11).

Figure 12:
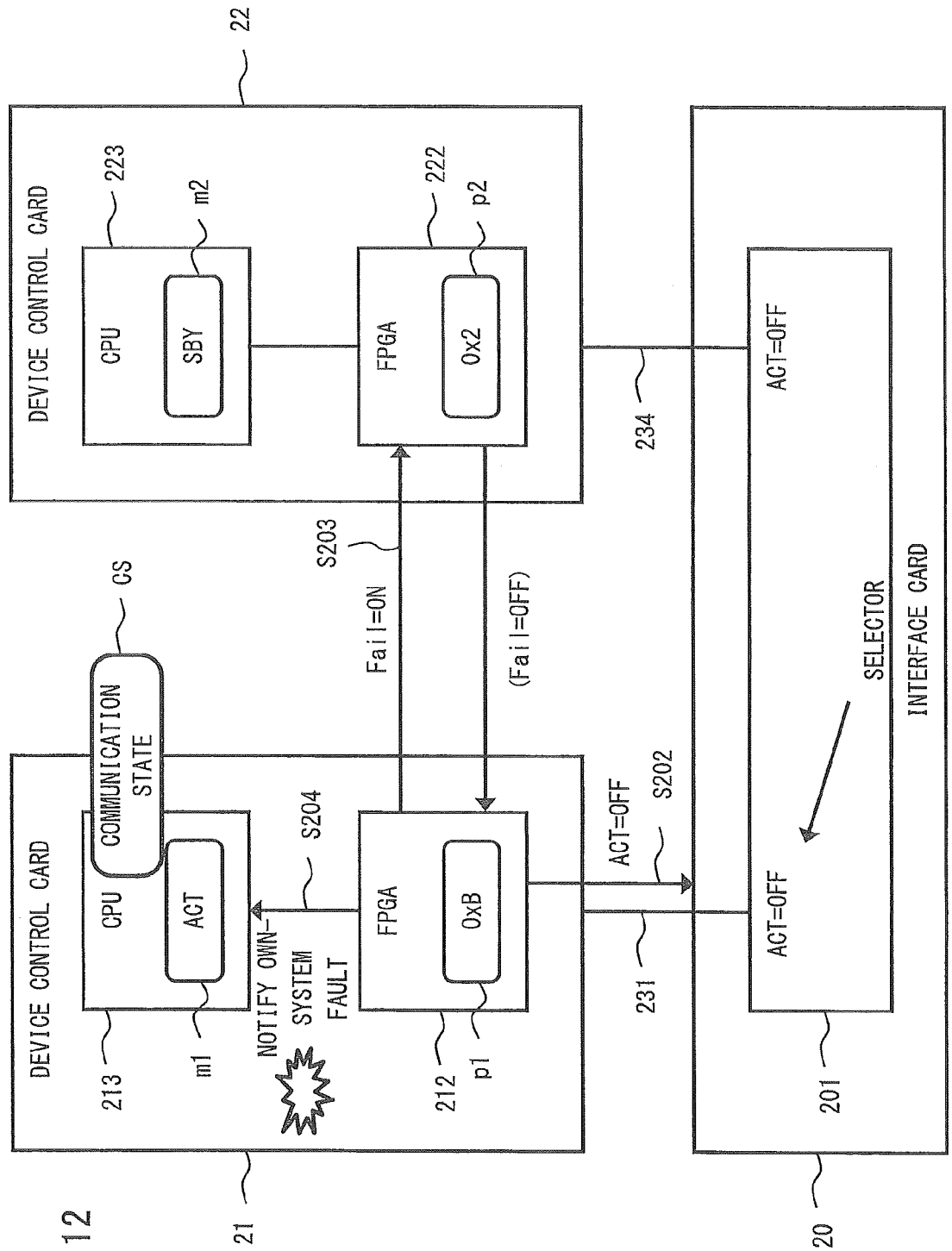
FIG. 12 is a diagram showing the example (2/6) of the active system switching operation upon detection of a fault according to the second exemplary embodiment of the present invention.

Next, the FPGA 212 outputs the ACT signal SIG13=OFF to the interface card 20 (S202, FIG. 12). Specifically, as the own-system FLT SIG11=ON, and the other-system FLT SIG12=OFF, and the ACT operation pattern is "11(0xB)", the FPGA 212 evaluates the ACT signal SIG13 to be "OFF" according to FIG. 7. Next, the FPGA 212 outputs the ACT signal SIG13=OFF to the interface card 20 through the control bus 232. Then, the selector 201 immediately stops using the main signal bus 231.

At the same time, the FPGA 212 notifies the FPGA 222, which is the other system, of the fault (S203, FIG. 12). Specifically, the FPGA 212 outputs the own-system FLT signal SIG11(Fail signal)=ON through the DC line 24. Then, the device control card 22 can recognize that the fault has occurred in the device control card 21. Furthermore, the FPGA 212 notifies the CPU 213 of the fault in the own system (S204, FIG. 12). Specifically, the FPGA 212 outputs the own-system FLT signal SIG11=ON to the CPU 213.

Figure 13:
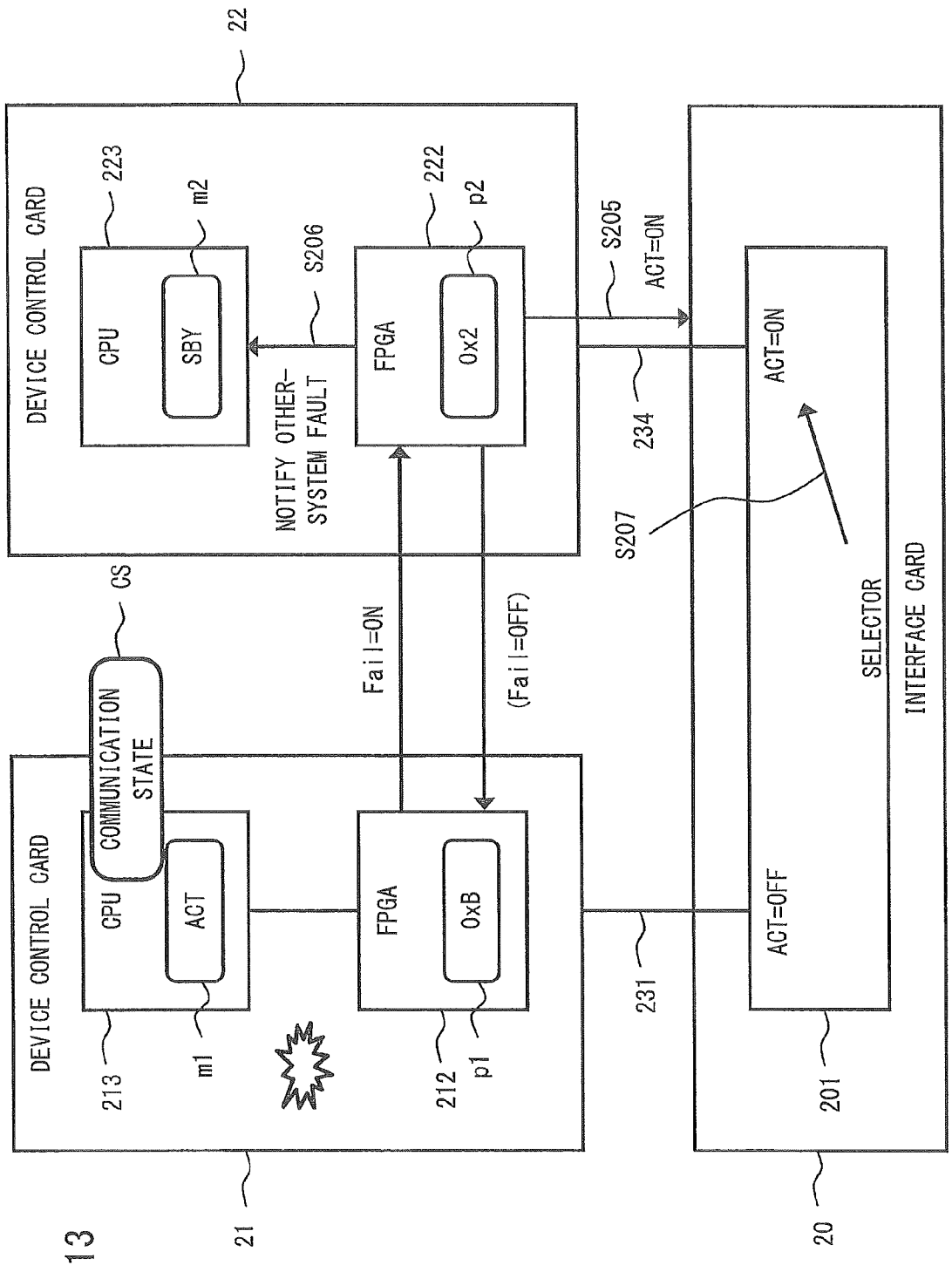
FIG. 13 is a diagram showing the example (3/6) of the active system switching operation upon detection of a fault according to the second exemplary embodiment of the present invention.
Figure 14:
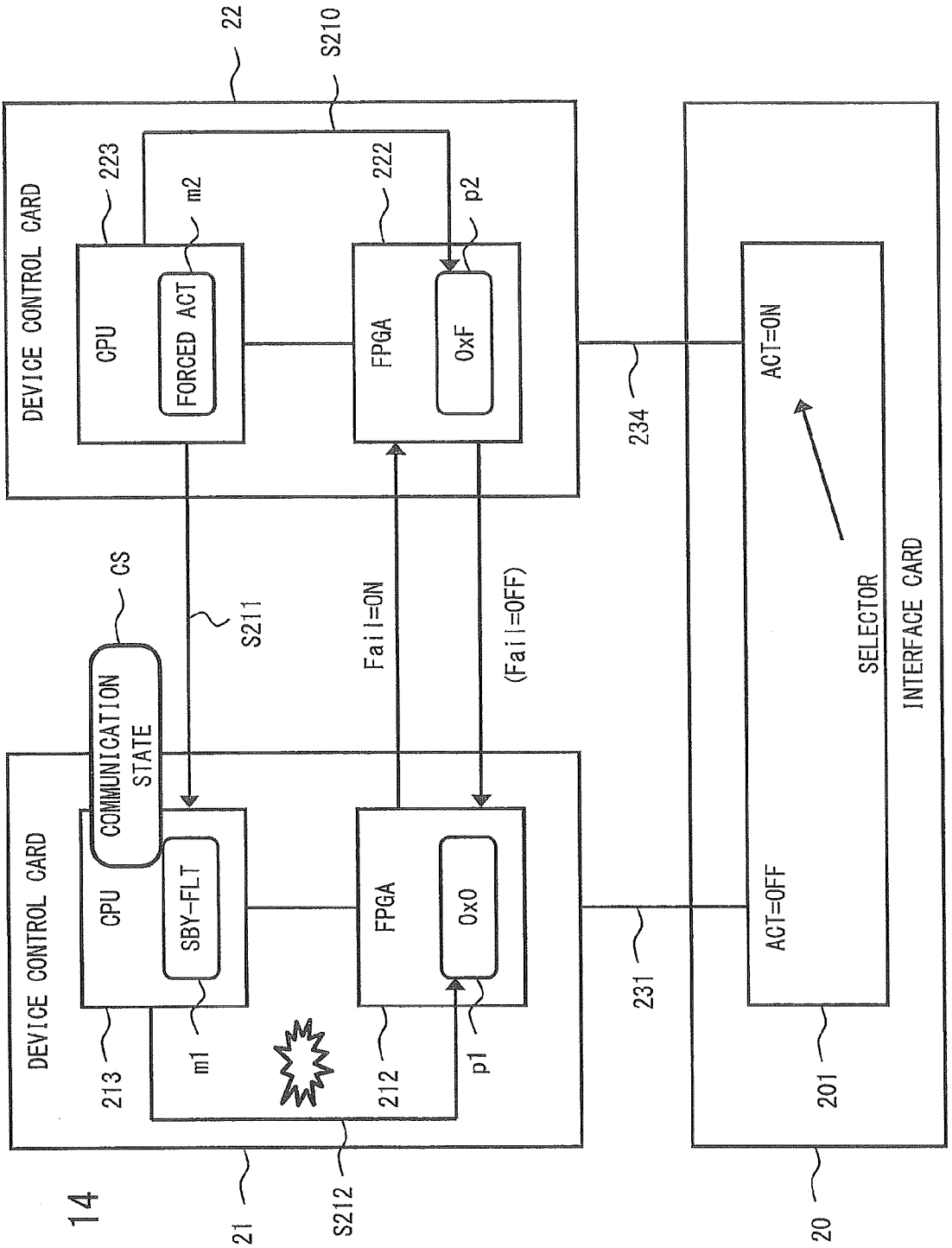
FIG. 14 is a diagram showing the example (4/6) of the active system switching operation upon detection of a fault according to the second exemplary embodiment of the present invention.

Next, the FPGA 222 outputs the ACT signal SIG23=ON to the interface card 20 (S205, FIG. 13). Specifically, in the FPGA 222, since the ACT operation pattern is "2(0x2)", the usage of the main signal bus 234 is not allowed at this point, and the ACT signal SIG23 is in the state of "OFF." Further, since the own-system FLT signal (Fail signal SIG21)=OFF, and the other-system FLT (Fail signal SIG28)=ON by the fault notification from the device control card 21, which is the other system for the device control card 22, the ACT signal SIG23 is evaluated to be "ON". Next, the FPGA 212 outputs the ACT signal SIG23=ON to the interface card 20 through the control bus 233. Then, the selector 201 immediately starts using the main signal bus 234. That is, the interface card 20 switches a selection of the transmission path from the main signal bus 231 to the main signal bus 234 (S207, FIG. 13).

At the same time, the FPGA 222 notifies the CPU 223 of the fault in the other system (S206, FIG. 13). Specifically, the FPGA 222 outputs the other-system FLT signal=ON to the CPU 223.

Figure 10:
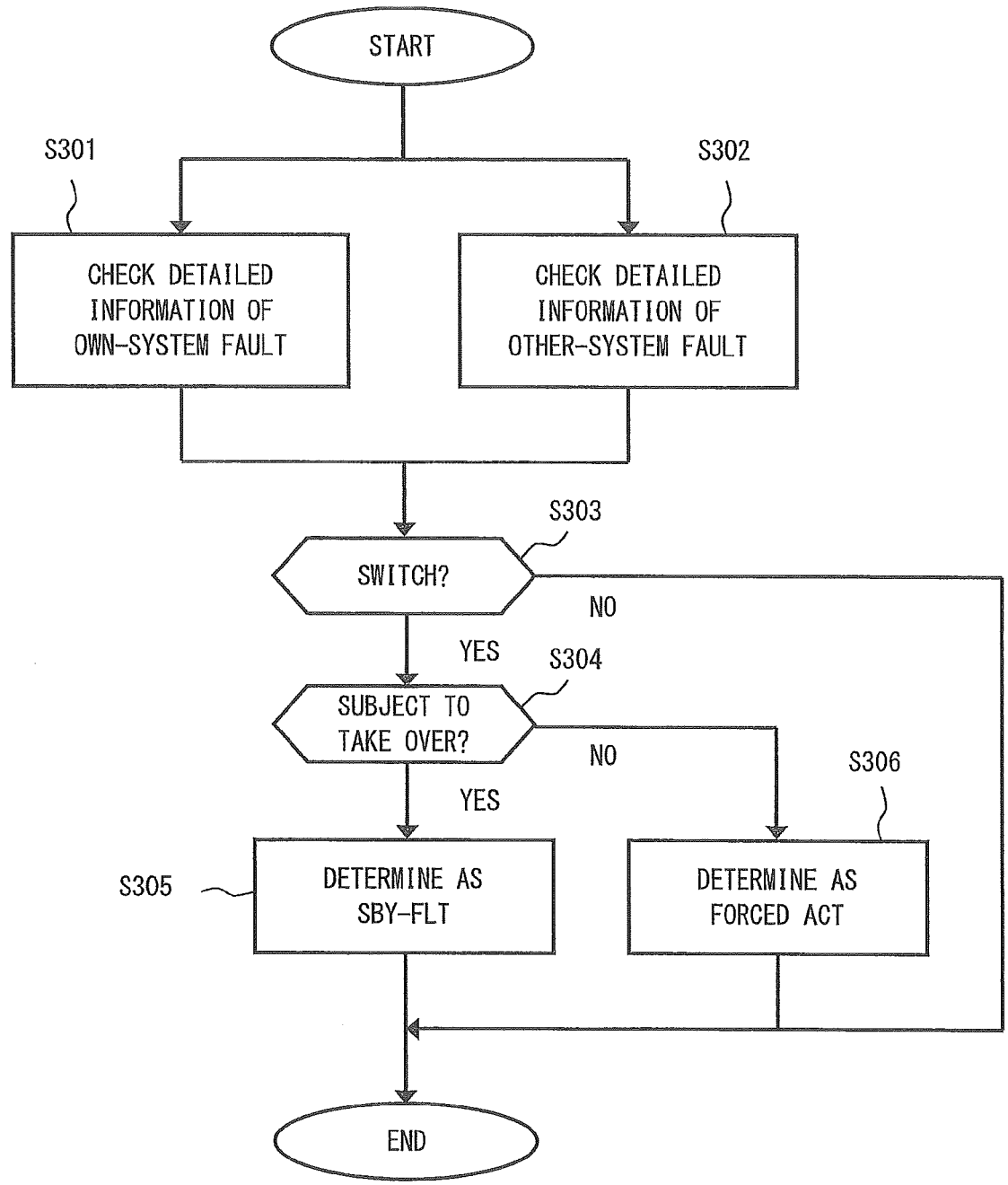
FIG. 10 is a flowchart showing a flow of fault analysis processing according to the second exemplary embodiment of the present invention.
Figure 11:
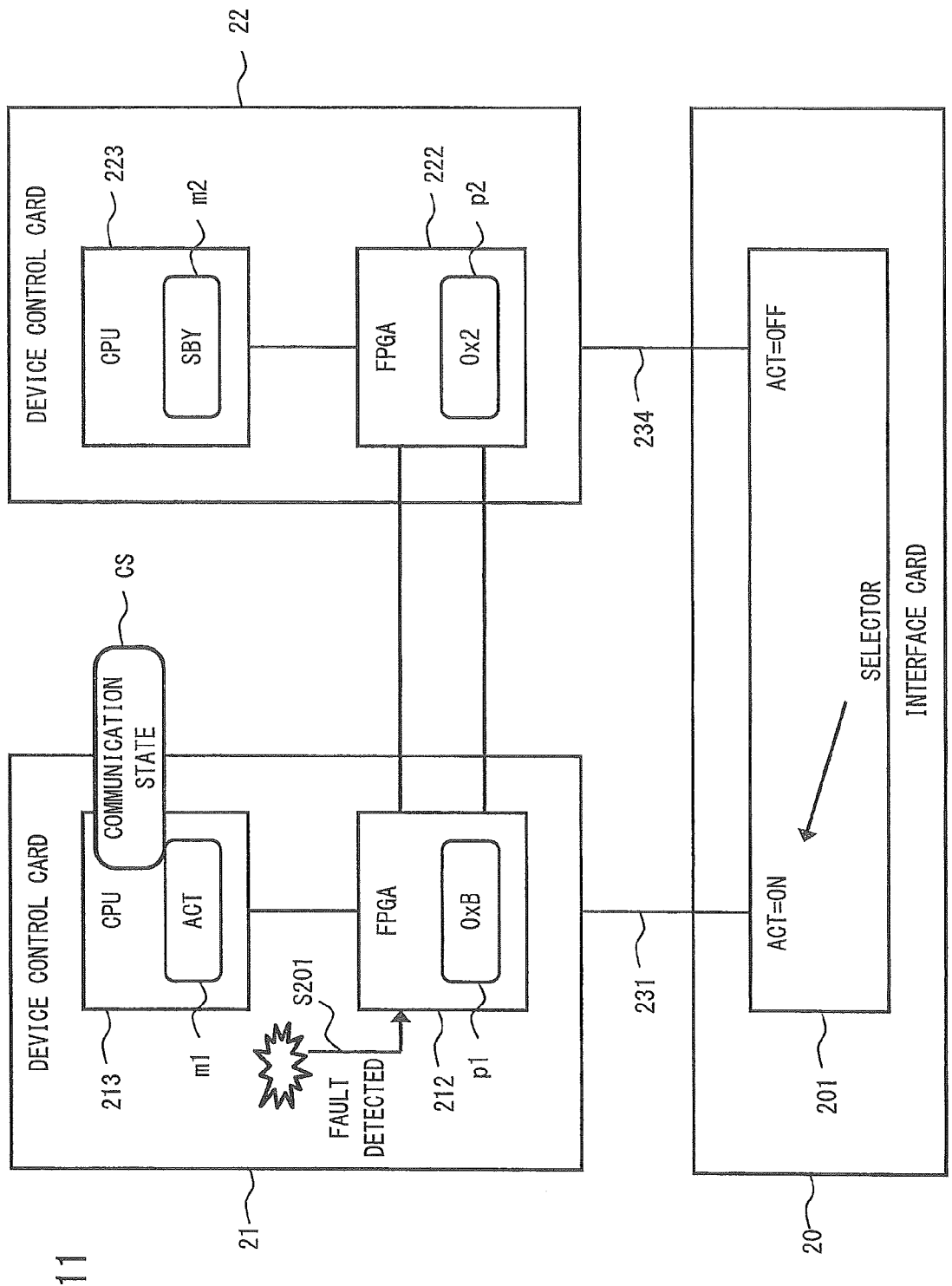
FIG. 11 is a diagram showing an example (1/6) of the active system switching operation upon detection of a fault according to the second exemplary embodiment of the present invention.

After that, each of the CPUs 213 and 223 performs fault analysis processing (S208 and S209). FIG. 10 is a flowchart showing a flow of the fault analysis processing according to the second exemplary embodiment of the present invention. An explanation of the CPU 213 shall be given now.

Firstly, the CPU 213 checks detailed information of an own-system fault (S301). Moreover, the CPU 213 checks detailed information of an other-system fault (S302). The CPU 213 reads the detailed information of the own-system fault and the other-system fault that is written in, for example, a register inside the device control card 21, and evaluates a location, a content, a degree and the like of the fault. Note that the CPU 213 is notified of the content of the fault as appropriate by the device control card 22 via the Ethernet 25 or the like, and the content or the like is recorded.

Next, the CPU 213 evaluates as to whether or not to switch the operation state (S303). As the operation state of the device control card 21 is "ACT", which indicates the active system, the CPU 213 evaluates as to whether or not to switch to the standby system. When the device control card 21 is no longer able to continue the communication service according to the content of the fault in the own system and no fault is occurring in the other system based on Steps S301 and S302, the CPU 213 evaluates that the operation state of the device control card 21 is switched to the standby system.

When an evaluation is made to switch, the CPU 213 evaluates as to whether or not the device control card 21 is subject to take over the communication state (S304). Since the device control card 21 is the active system, the CPU 213 evaluates that the device control card 21 is subject to take over the communication state and determines the operation state of the device control card 21 to be "SBY-FLT" (S305).

Moreover, in the case of the CPU 223 of the device control card 22, an evaluation is made that the device control card 22 is not subject to take over the communication state in Step S304 and determines the operation state of the device control card 22 to be "FORCED ACT" (S306).

Note that when an evaluation is made not to switch in Step S303, the CPU 213 ends the processing. While the device control card 22, which has originally been SBY, enters a faulty state (is changed to SBY-FLT), when a fault occurs in the device control card 21, which is in the state of ACT, both systems will become faulty. However in this case, as for the operation of the FPGA 212, since the own-system FLT signal SIG11=ON and the other-system FLT signal SIG12=ON when the ACT operation pattern is "11(0xB)", the ACT signal SIG13 remains ON, and the CPU 213 evaluates that it is not necessary to switch and the operation state of the device control card 21 is "ACT-FLT" and may change Referring back to FIG. 9, the explanation shall be continued. The CPU 223 is changed to the operation state "FORCED ACT" that is determined in Step S209 (S210, FIG. 14). Specifically, the CPU 223 records "FORCED ACT" in the register inside the FPGA 222, and the FPGA 222 recognizes that the pattern p2 is "0xF." After that, the CPU 223 notifies the CPU 213 that the state change has been completed (S211, FIG. 14). Then, the CPU 213 is changed to the operation state "SBY-FLT" that is determined in Step S208 (S212, FIG. 14). Specifically, the CPU 213 records "SBY-FLT" in the register inside the FPGA 212, and the FPGA 212 recognizes that the pattern p1 is "0x0."

Figure 15:
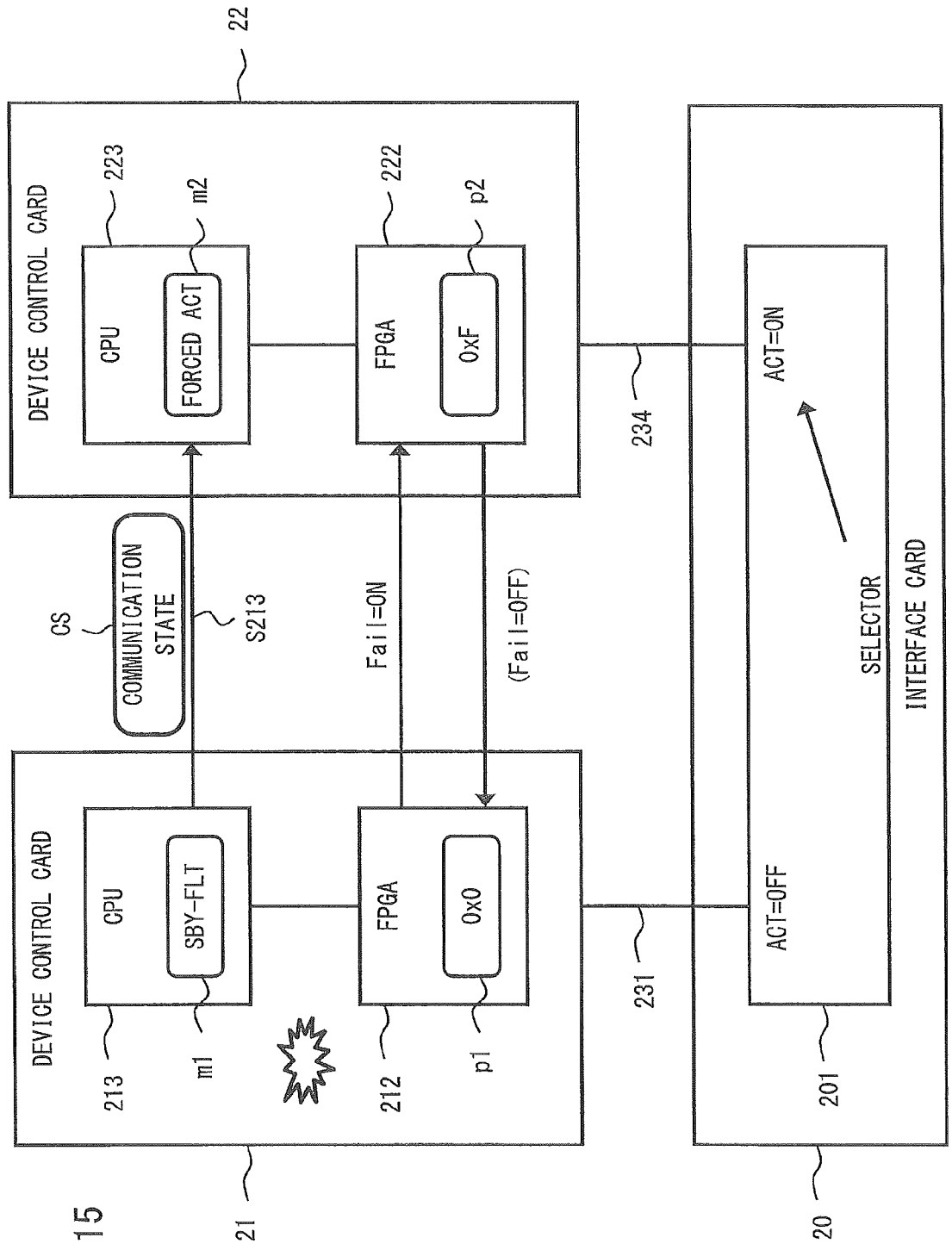
FIG. 15 is a diagram showing the example (5/6) of the active system switching operation upon detection of a fault according to the second exemplary embodiment of the present invention.
Figure 16:
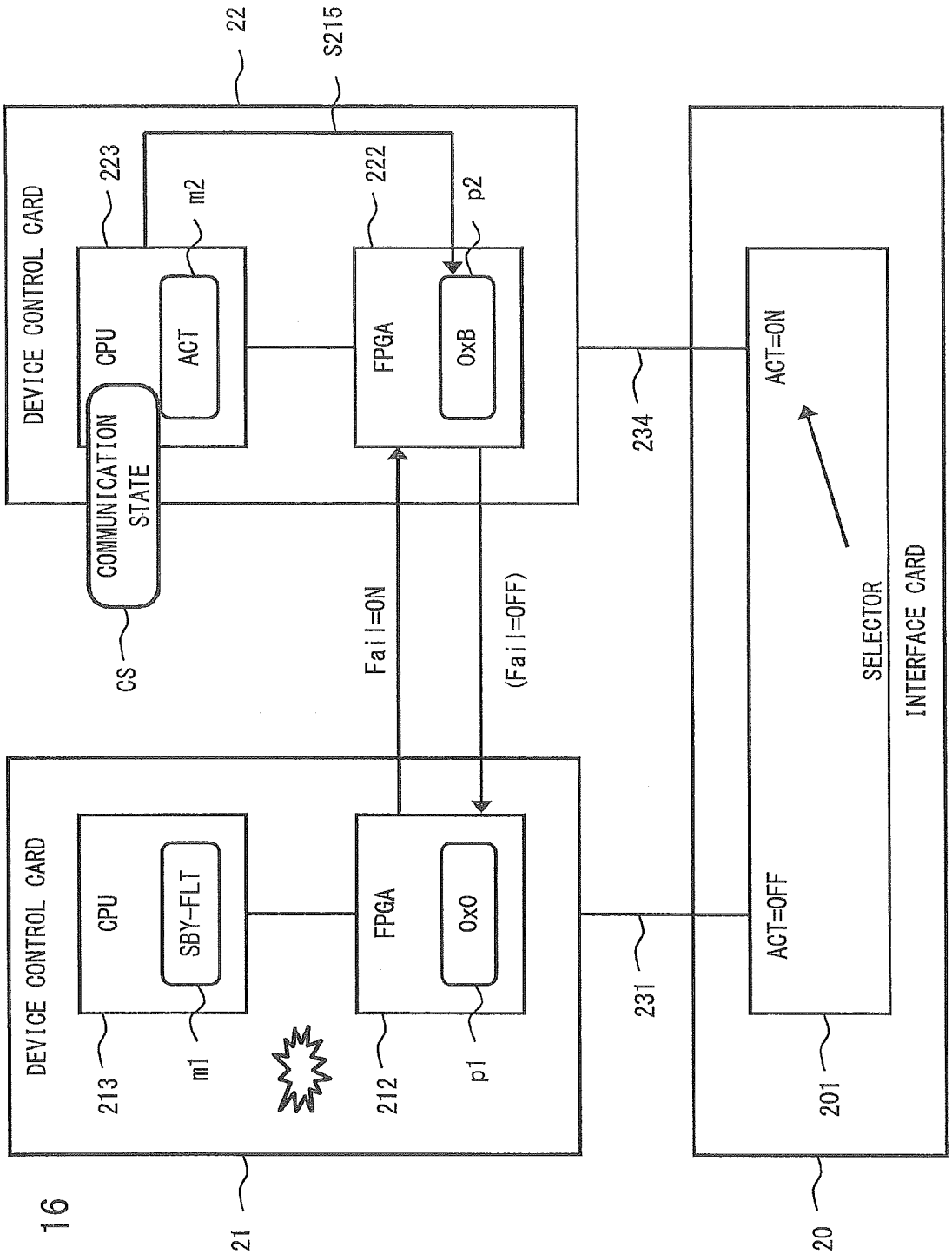
FIG. 16 is a diagram showing the example (6/6) of the active system switching operation upon detection of a fault according to the second exemplary embodiment of the present invention.

After that, the CPU 213 transmits the communication state CS to the CPU 223 (S213, FIG. 15). Then, the CPU 223 sets the transferred communication state CS in the device control card 22 (S214). After that, the CPU 223 changes the operation state of the device control card 22 to "ACT" (S215, FIG. 16). Specifically, the CPU 223 records "ACT" in the register inside the FPGA 222, and the FPGA 222 recognizes that the pattern p2 is "0xB."

As explained so far, even when a fault occurs in the device control card 21, the FPGAs 212 and 222, which are the hardware circuits, immediately switch OFF/ON of the ACT signal, and the selector 201 can continue to transmit the communication data through the switched main signal bus 234. Since the switching by the FPGA 212 and 222 can be realized within 50 ms, a delay in the communication can be minimized. Moreover, as it is not realistic to take over the communication state CS by the hardware circuits, the takeover can be accurately performed between the CPUs 213 and 223 via the Ethernet 25. Therefore, as soon as the communication state CS is taken over to the device control card 22, communication relay can be resumed correctly.

Note that the present invention is not limited by the above exemplary embodiments and appropriate modifications can be made without departing from the scope thereof.

The present application claims priority rights of and is based on Japanese Patent Application No. 2011-237985 filed on Oct. 28, 2011 in the Japanese Patent Office, the entire contents of which are hereby incorporated by reference.

INDUSTRIAL APPLICABILITY

The present invention is useful as a radio communication apparatus in which when a communication apparatus on a transmission side cannot directly communicate with a communication apparatus on a reception side, a relay apparatus relays and transmits a signal between these communication apparatuses.

REFERENCE SIGNS LIST

1 COMMUNICATION RELAY APPARATUS
10 IF UNIT
11 FIRST BOARD
111 FIRST TRANSMISSION CONTROL CIRCUIT
112 FIRST COMMUNICATION STATE CONTROL UNIT
12 SECOND BOARD
121 SECOND TRANSMISSION CONTROL CIRCUIT
122 SECOND COMMUNICATION STATE CONTROL UNIT
131 FIRST TRANSMISSION PATH
132 SECOND TRANSMISSION PATH
14 COMMUNICATION DATA
2 COMMUNICATION RELAY APPARATUS
20 INTERFACE CARD
201 SELECTOR
202 ACT SIGNAL DETECTION UNIT
21 DEVICE CONTROL CARD
2101 TDM SWITCH
2102 PACKET SWITCH
211 MAIN SIGNAL TRANSMISSION UNIT
212 FPGA
213 CPU
214 FW DETECTING OWN-SYSTEM Fail
215 HW DETECTING OWN-SYSTEM Fail SIGNAL
216 OR CIRCUIT
217 PATTERN
218 STATE MACHINE
219 OR CIRCUIT
22 DEVICE CONTROL CARD
221 MAIN SIGNAL TRANSMISSION UNIT
222 FPGA
223 CPU
23 AUXILIARY CARD
231 MAIN SIGNAL BUS
232 CONTROL BUS
233 CONTROL BUS
234 MAIN SIGNAL BUS
24 DC LINE
25 Ethernet
m1 MODE
p1 PATTERN
m2 MODE
p2 PATTERN
CS COMMUNICATION STATE
ST000, ST004, ST005, ST010, ST012, ST014, ST015, ST030, ST034, ST035, ST140, ST150, ST101, ST121, ST141, ST151, ST103, ST143, and ST153 STATE
SIG11 OWN-SYSTEM FLT SIGNAL
SIG12 OTHER-SYSTEM FLT SIGNAL
SIG13 ACT SIGNAL
SIG14 POWER OFF SIGNAL
SIG15 UNMOUNT SIGNAL
SIG21 FAIL SIGNAL
SIG23 ACT SIGNAL
SIG24 POWER OFF SIGNAL
SIG25 UNMOUNT SIGNAL
SIG26 POWER OFF SIGNAL
SIG27 UNMOUNT SIGNAL
SIG28 FAIL SIGNAL
SIG29 ACT SIGNAL

The invention claimed is:

1. A communication relay apparatus, comprising:
an interface (IF) unit that externally transmits and receives communication data;
a first board that comprises:
a first transmission control circuit that is connected to the IF unit by a first transmission path and controls usage of the first transmission path by the IF unit; and
a first communication state control unit that manages a communication state of the communication data that has passed through the first transmission path; and
a second board that is mounted as a redundant board of the first board and comprises:
a second transmission control circuit that is connected to the IF unit by a second transmission path and controls usage of the second transmission path by the IF unit; and
a second communication state control unit that manages a communication state of the communication data that has passed through the second transmission path,
wherein, when an operation state of the first board is an active system and the first transmission control circuit detects a fault in the first board, the first transmission control circuit gives an instruction to the IF unit as to whether or not the usage of the first transmission path is allowed and notifies the second transmission control circuit and the first communication state control unit that the fault is detected,
wherein, in response to a notification from the first transmission control circuit, the second transmission control circuit gives an instruction to the IF unit as to whether or not the usage of the second transmission path is allowed,
wherein, the first communication state control unit evaluates as to whether or not to switch the operation state of the first board to a standby system, and
wherein, when an evaluation is made to switch the operation state of the first board to the standby system, the first communication state control unit starts to take over the communication state of the communication data, which has passed through the first transmission path, to the second communication state control unit.

2. The communication relay apparatus according to claim 1, wherein the second transmission control circuit notifies the first transmission control circuit of existence or absence of a fault in the second board,
wherein, when the operation state of the first board is the active system and the first transmission control circuit detects a fault in the first board, the first transmission control circuit evaluates as to whether or not the usage of the first transmission path is allowed according to existence or absence of a fault in the second board, and
wherein, the first transmission control circuit gives an instruction to the IF unit based on an evaluation result.

3. The communication relay apparatus according to claim 2, wherein, when the operation state of the first board is switched, the first communication state control unit determines a switch pattern for the first transmission circuit to switch between whether or not the usage of the first transmission path is allowed based on the switched operation state and sets the determined switch pattern in the first transmission control circuit, wherein, when the first transmission control circuit detects a fault in the first board or receives, from the second transmission control circuit, a notification that a fault is detected, the first transmission control circuit identifies whether or not the usage of the first transmission path is allowed according to the switch pattern that has been set by the first communication state control unit and a combination of existence or absence of a fault in the first board and existence or absence of a fault in the second board, which is notified by the second transmission control circuit, and wherein, the first transmission control circuit gives an instruction of a result of the identification to the IF unit.

4. The communication relay apparatus according to claim 1, wherein, when the first communication state control unit detects a fault, which cannot be detected by the first transmission control circuit, in the first board, the first communication state control unit notifies the first transmission control circuit that the fault is detected in the first board, and wherein, when the first transmission control circuit receives a notification from the first communication state control unit, the first transmission control circuit detects the fault as a fault in the first board.

5. The communication relay apparatus according to claim 1, wherein, in response to the notification from the first transmission control circuit, the second transmission control circuit further notifies the second communication state control unit that the first board is faulty, wherein, in response to a notification from the second transmission control circuit, the second communication state control unit changes an operation state of the second board to a state not allowed to be switched and notifies the first communication state control unit to that effect, wherein, in response to a notification from the second communication state control unit, the first communication state control unit transfers the communication state of the communication data, which has passed through the first transmission path, to the second communication state control unit, and wherein, after the second communication state control unit completes setting of the communication state, which has been transferred from the first communication state control unit, the second communication state control unit switches the operation state of the second board to the active system.

6. A method of switching comprising the steps of:

switching an active system by using a communication relay apparatus, wherein the communication relay apparatus comprises:

an interface (IF) unit that externally transmits and receives communication data;

a first board that comprises:

a first transmission control circuit that is connected to the IF unit by a first transmission path and controls usage of the first transmission path by the IF unit; and a first communication state control unit that manages a communication state of the communication data that has passed through the first transmission path; and a second board that is mounted as a redundant first board and comprises:

a second transmission control circuit that is connected to the IF unit by a second transmission path and controls usage of the second transmission path by the IF unit; and a second communication state control unit that manages a communication state of the communication data that has passed through the second transmission path;

giving an instruction, by the first transmission control circuit, to the IF unit as to whether or not the usage of the first transmission path is allowed and notifying the second transmission control circuit and the first communication state control unit that the fault is detected, when an operation state of the first board is an active system and the first transmission control circuit detects a fault in the first board, giving an instruction, by the second transmission control circuit, to the IF unit as to whether or not the usage of the second transmission path is allowed, in response to a notification from the first transmission control circuit, evaluating, by the first communication state control unit, as to whether or not to switch the operation state of the first board to a standby system, and starting, by the first communication state control unit, to take over the communication state of the communication data that has passed through the first transmission path, when an evaluation is made to switch the operation state of the first board to the standby system.

7. The method according to claim 6, further comprising:

notifying, by the second transmission control circuit, the first transmission control circuit of existence or absence of a fault in the second board;

evaluating, by the first transmission control circuit, as to whether or not the usage of the first transmission path is allowed according to existence or absence of a fault in the second board, when the operation state of the first board is the active system and the first transmission control circuit detects a fault in the first board; and giving, by the first transmission control circuit, an instruction to the IF unit based on an evaluation result.

8. The method according to claim 7, further comprising:

determining, by the first communication state control unit, a switch pattern for the first transmission circuit to switch between whether or not the usage of the first transmission path is allowed based on the switched operation state when the operation state of the first board is switched and setting, by the first communication state control unit, the determined switch pattern in the first transmission control circuit;

identifying, by the first transmission control circuit, whether or not the usage of the first transmission path is allowed according to the switch pattern that has been set by the first communication state control unit and a combination of existence or absence of a fault in the first board and existence or absence of a fault in the second board, when the first transmission control circuit detects a fault in the first board or receives, from the second transmission control circuit, a notification that a fault is detected; and giving, by the first transmission control circuit, an instruction of a result of the identification to the IF unit.

9. The method according to claim 6, further comprising:

notifying, by the first communication state control unit, the first transmission control circuit that the fault is detected in the first board, when the first communication state control unit detects a fault, which cannot be detected by the first transmission control circuit, in the first board; and detecting, by the first transmission control circuit the fault as a fault in the first board, when the first transmission control circuit receives a notification from the first communication state control unit.

10. The method according to claim 6, further comprising:
further notifying, the second transmission control circuit, the second communication state control unit that the first board is faulty, in response to the notification from the first transmission control circuit;
changing, by the second communication state control unit, an operation state of the second board to a state not allowed to be switched and notifies the first communication state control unit to that effect, in response to a notification from the second transmission control circuit;
transferring, by the first communication state control unit, the communication state of the communication data, which has passed through the first transmission path, to the second communication state control unit, in response to a notification from the second communication state control unit; and
switching, by the second communication state control unit, the operation state of the second board to the active system, after the second communication state control unit completes setting of the communication state, which has been transferred from the first communication state control unit.

11. A communication relay control board, comprising:
a first transmission control circuit that is connected to an interface (IF) unit by a first transmission path and controls usage of the first transmission path by the IF unit, the IF unit externally transmitting and receiving communication data; and
a first communication state control unit that manages a control state of the communication data that has passed through the first transmission path,
wherein, the communication relay control board is mounted as a redundant board of another board that is connected to the IF unit by a second transmission path,
wherein, when an operation state of the first transmission control circuit is an active system and detects its own fault, the first transmission control circuit:
gives an instruction to the IF unit as to whether or not the usage of the first transmission path is allowed;
notifies the other board that the fault is detected and gives an instruction to the IF unit whether or not usage of the second transmission path is allowed; and
notifies the first communication state control unit that the fault is detected,
wherein, in response to a notification from the first transmission control circuit, the first communication state control unit evaluates as to whether or not to switch its own operation state to a standby system, and
wherein, when the first communication state control unit evaluates that its own operation state is switched to the standby system, the first communication state control unit starts to take over the communication state of the communication data, which has passed through the first transmission path, to the other board.

12. The communication relay control board according to claim 11, wherein when the operation state of the first board is the active system and the first transmission control circuit detects a fault in the first board, the first transmission control circuit evaluates as to whether or not the usage of the first transmission path is allowed according to existence or absence of a fault in the second board, and
wherein the first transmission control circuit gives an instruction to the IF unit based on an evaluation result.

13. The communication relay control board according to claim 12, wherein, when the operation state of the first board is switched, the first communication state control unit determines a switch pattern for the first transmission circuit to switch between whether or not the usage of the first transmission path is allowed based on the switched operation state and sets the determined switch pattern in the first transmission control circuit,
wherein, when the first transmission control circuit detects a fault in the first board or receives, from the second transmission control circuit, a notification that a fault is detected, the first transmission control circuit identifies whether or not the usage of the first transmission path is allowed according to the switch pattern that has been set by the first communication state control unit and a combination of existence or absence of a fault in the first board and existence or absence of a fault in the second board, which is notified by the second board, and
wherein, the first transmission control circuit gives an instruction of a result of the identification to the IF unit.

14. The communication relay control board according to claim 11, wherein, when the first communication state control unit detects a fault, which cannot be detected by the first transmission control circuit, in the first board, the first communication state control unit notifies the first transmission control circuit that the fault is detected in the first board, and
wherein, when the first transmission control circuit receives a notification from the first communication state control unit, the first transmission control circuit detects the fault as a fault in the first board.

* * * * *